Aug. 13, 1946.   B. E. JOHNSTON   2,405,833
STRUCTURE FOR LOADING TRAILERS ON FLATCARS
Filed Oct. 19, 1944   2 Sheets-Sheet 2
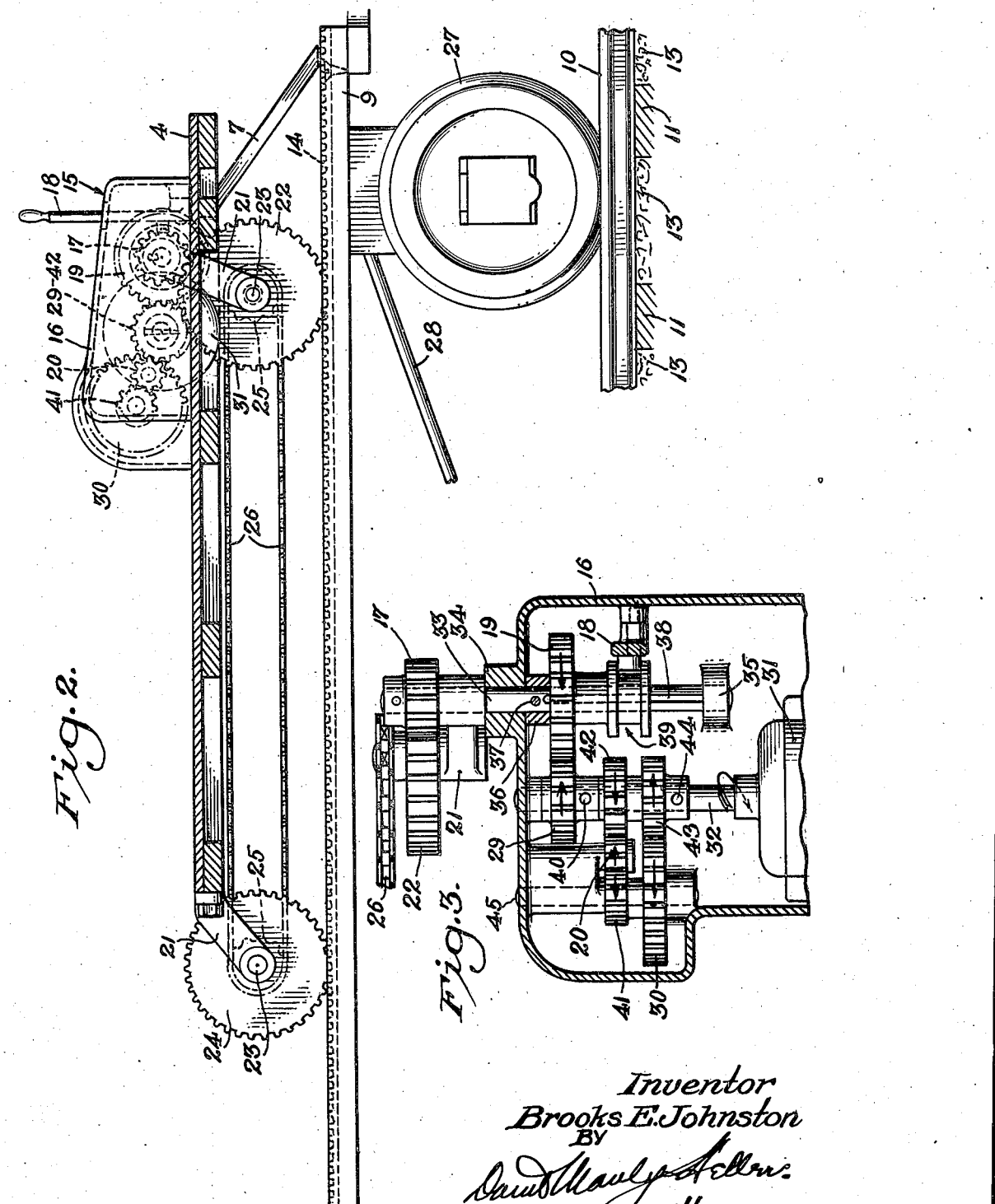
Inventor
Brooks E. Johnston
BY
Attorney.

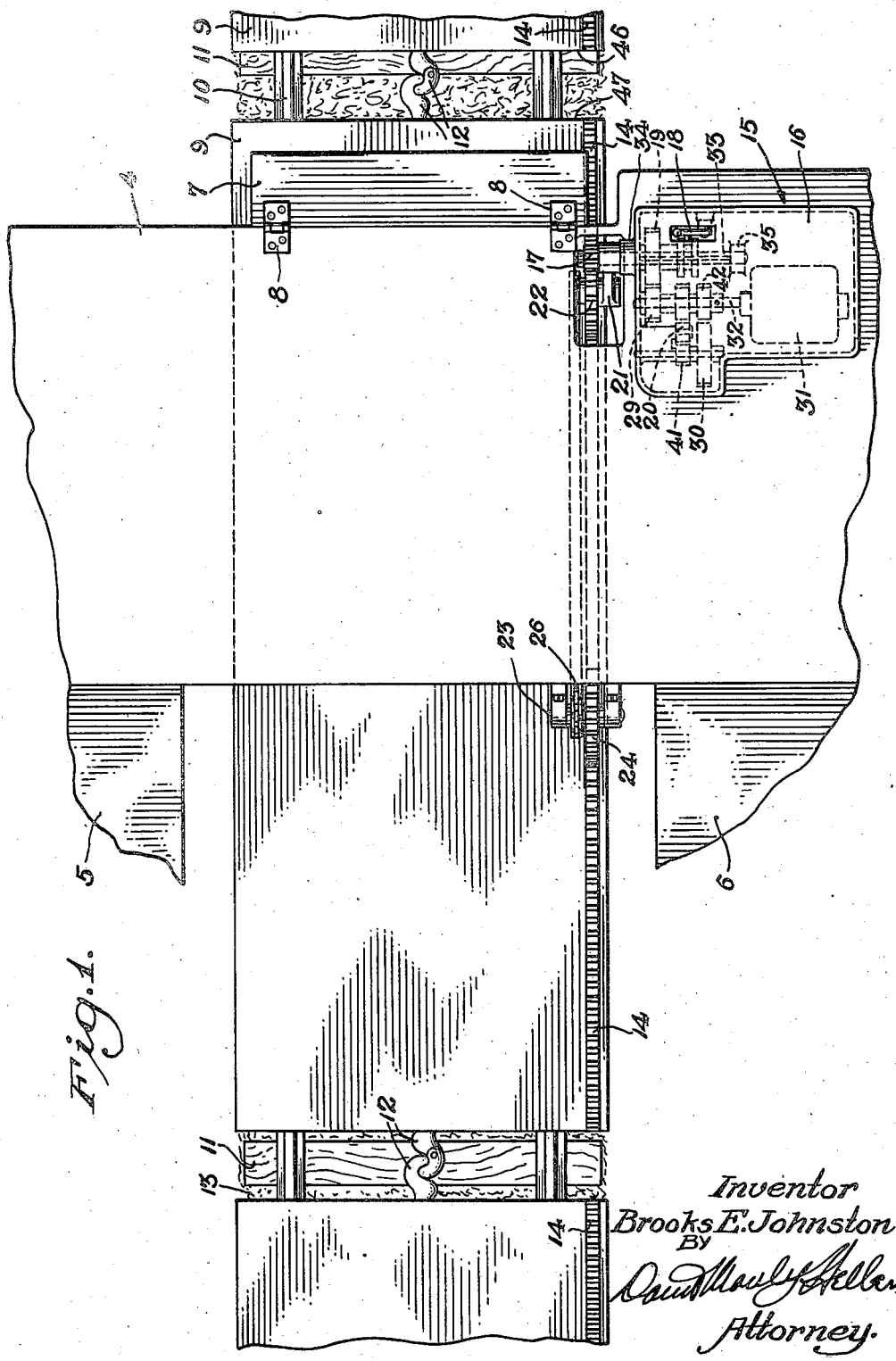

Patented Aug. 13, 1946

2,405,833

UNITED STATES PATENT OFFICE 2,405,833

STRUCTURE FOR LOADING TRAILERS ON FLATCARS

Brooks E. Johnston, Chicago, Ill.

Application October 19, 1944, Serial No. 559,346

8 Claims. (Cl. 214—38)

The invention disclosed herein appertains to means for loading and unloading trailers drawn by tractors and positioning or removing the same from the top decks of flat cars, the instant application being an improvement over my co-pending application Serial Number 536,895.

One object of the present invention is to provide a horseshoe-shaped ramp structure which straddles railway tracks and clears the top decks of flat cars running on the said tracks, the said ramp means is provided with apron means articulately secured to the upper deck thereof and is adapted to rest on the top deck of the said flat cars, gear rack means embedded in the top deck of the said flat cars, and duplex geared motivating means in meshing relationship with the said rack means to provide periodic motion to the said flat cars during the operation of loading, or unloading, trailers onto or from the top decks of the said flat cars.

Another object of my invention is to provide a device or structure of the aforementioned character which is practical in construction, efficient and expeditious in its operation and function, and of such simple construction that it may be manufactured and constructed economically and with minimum of expense.

Other features, objects and advantages resident in my invention will become apparent from an examination of the accompanying drawings, having also reference to my co-pending application hereinabove referred to, and the ensuing description wherein like symbols designate like parts, and in which;

Fig. 1 represents a fragmentary plan view of a ramp structure cooperating with the structural driving details embraced in the flat car construction, also showing the prime mover means geared thereto in order to furnish a complete system for the loading and unloading operation of trailers.

Fig. 2 is a fragmentary enlarged view of the gearing mechanism utilized for moving the flat cars intermittently, and periodically, on the rails on which they may be destined to operate.

Fig. 3 is a top view looking down on Figure 2 and showing the gearing transmission permitting operation of the said flat cars intermittently, or periodically, and as well in both forward and backward directions, so that the said flat cars may be moved either to the right of Figure 1, or to the left of Figure 1, respectively, for unloading, and for loading operation.

The construction, generally, consists of a horseshoe-shaped ramp structure, designated 4, that portion being the upper deck of the horseshoe- shaped ramp and lying substantially clear of the flat cars, generally, designated 9. The top level deck 4, is connected to two ramp sections 5 and 6 respectively, accommodating a tractor and trailer which may run up the ramp 6, position itself on the platform 4, then after its trailer has been loaded on the flat car 9, it may run off on ramp 5, and subsequently the said tractor may pick up another trailer to repeat the cycle of operation.

The operation of loading and unloading trailers drawn by tractors is clearly elucidated in my copending application hereinabove set forth, and the structural details of the ramp structure 4 and the apron 7 are practically the same inasmuch as this upper section of the horseshoe-shaped ramp 4 has to clear the top deck of the flat cars 9, and the angularly positioned apron 7 is secured articulately to the deck 4 by virtue of hinges 8, the said elements comprising part of the equipment necessary to permit backing off trailers from deck 4 onto the top of the flat cars 9, and vice versa for pulling up the trailers from the top deck of the flat cars 9 onto the deck 4, when the operation is reversed, namely, when unloading trailers from the flat cars.

The flat cars are of conventional construction, and are usually interconnected by the couplers 12 being positioned to operate on tracks 10 laid over ties 11 embedded in gravel surface 13. The flat cars are each provided with a rack 14 adjacent one edge thereof on the top deck, and running the full length of the car, the said racks 14 on all cars being in co-axial alignment.

To the top deck 4 is secured the motivating geared means, generally, designated 15, its construction being more clearly elucidated in Figures 2 and 3 where a fragmentary portion of the flat car 9 is shown in proper relation therewith, the wheel bearing showing the proper support for wheels 27 adapted to ride on the track 10; the strut 28 reinforcing the front bearing to the rear bearing of the flat car.

The motivating mechanism comprises a case 16 which is equipped with suitable gearing for forward and reverse operation so as to move the flat cars either to the right of Figure 2, or to the left thereof as conditions may necessitate. The driving consists, as seen in Figure 3, of a prime mover or motor 31 having an extended shaft 32 on which is mounted a gear 43 which is keyed or pinned thereto so as to rotate therewith.

The shaft is extended and operated in the casing 16 at its other end in a suitable bearing, and has secured at its other end adjacent the said bearing a gear 29 which is also keyed by virtue of pin 40, the gear 43 being secured thereto by means of pin 44. Intermediate the gears 29 and 43, an idler gear 42 is positioned on the shaft 32 to rotate freely thereupon. An intermediate shaft 45 is journaled in suitable bearing in the framework 16, and has mounted thereon the compound gear 30 being integral with the pinion 41 which meshes with an intermediate gear 20, in turn positioned to mesh with the gear 42.

If the motor shaft 32 were to rotate in the direction shown by the arrow namely clockwise, then the gear 29 being in mesh with the sliding gear 19 will cause the pinion 17 to be rotated counter-clockwise. The lever 18 is fulcrumed on a suitable pivot its intermediate hub extension engages a spool-like section 39 integral with the gear 10. When the lever 18 is moved so as to cause the spool-like section to contact the bearing 35, then the gear 19 will be caused to mesh with the gearing 42 thus reversing the rotation and causing the pinion to operate in a clockwise direction thus moving the flat car forward, or in reverse as the situation may require depending on the movement of the lever 18 and its resultant effect on the movement of gears 19.

The gear 19 is secured to the shaft 33 by means of a spline, or feather key 38 so as to permit the gear 19 to rotate with the shaft 33 and also be slidably movable thereon. The shaft 33 is journaled in the bearing 35 and the hub 34, and has pinned thereto at 37 the collar 36 so as to limit the motion of the gear 19 to cause engagement thereof either for enmeshing relationship with the gear 29 or the gear 42.

The shaft 33 also passes thru suitable bearings 21 in which are positioned shafts 23 supporting the duplex driving gears 22 and 24, the province of the shafts 23 serving to have mounted thereon also the sprockets 25 enmeshed with an endless sprocket chain 26, so that when the pinion 17 causes the gear 22 to be rotated either clockwise or counter-clockwise, its companion gear 24 will likewise be operated either clockwise or counter-clockwise. These gears are set to span a certain distance, which is at least larger than the increment of space between adjacent ends of flat cars secured by the couplers 12, namely the space between ends 46 and 47. The reason for this being that the said gears will always be in mesh with some portion of a rack of at least one flat car, so that when one gear runs out of mesh with the rack of a flat car, the other gear will be in mesh with the rack of the same or an adjacent flat car, thus the motion will be uninterrupted. When the other gear runs out of mesh with respect to the rack which it has been engaging, the former gear which had first been disengaged will become engaged so that at all times at least one of the gears 22 or 24 will be in meshing relationship with the racks 14 of the same or different flat cars thus providing continuous periodic movement of a train of such cars connected up by the coupler means.

The operation of loading and unloading trailers with respect to the said flat cars is rather explicitly described in my co-pending application Serial #536,895.

I believe I have described the nature and operation of my improvement, and inasmuch as the same is susceptible of variations, I reserve the right to all such variations falling within the scope and spirit of my, herein, disclosed invention, as well as those improvements falling within the purview of the accompanying drawings and the foregoing description; my invention to be limited only to the appended claims.

Having thus described and revealed my invention, what I claim as novel and desire to secure by Letters Patent is:

1. In combination, a freight loading structure adapted for loading trailers onto flat cars operating on rails comprising, a horse-shoe-shaped ramp structure having its termini astraddle the said rails and its upper platform clearing the top deck of said flat cars, and means associated with said ramp structure adapted to motivate a train of flat cars a predetermined distance intermittently, the said motivating means comprising geared drive means located on the said horse-shoe-shaped ramp structure, rack means embedded on the decks of said flat cars in meshing relationship with the said geared drive means, and starting means associated with the said geared drive means.

2. In combination, a freight loading structure adapted for loading trailers onto flat cars operating on rails comprising, a horse-shoe-shaped ramp structure having its termini astraddle the said rails and its upper platform clearing the top deck of said flat cars, apron means articulately secured to the said upper platform and adapted to rest on its free edge on the top deck of said flat cars, and means associated with said ramp structure adapted to motivate a train of flat cars a predetermined distance intermittently, the said motivating means comprising geared drive means located on the said horse-shoe-shaped ramp structure, rack means embedded on the decks of said flat cars in meshing relationship with the said geared drive means, and starting means associated with the said geared drive means.

3. In a freight loading system adapted for loading trailers into flat cars operating on rails, motivating means adapted to move a train of flat cars a predetermined distance intermittently comprising, geared drive means motivated by a suitable prime mover, a driving pinion associated with the said geared drive means, a primary driven gear in meshing relationship with the said driving pinion, a secondary driven gear positioned at a distance less than the length of one of said flat cars from the said primary driven gear, chain and sprocket means interconnecting the said primary and secondary driven gears to operate in unison, and rack means embedded on the decks of said flat cars in meshing engagement with the said primary and secondary driven gears.

4. In a freight loading system adapted for loading trailers onto flat cars operating on rails, motivating means adapted to move a train of flat cars a predetermined distance intermittently comprising, geared drive means motivated by a suitable prime mover, a driving pinion associated with the said geared drive means, a primary driven gear in meshing relationship with the said driving pinion, a secondary driven gear positioned at a distance less than the length of one of said flat cars from the said primary driven gear, chain and sprocket means interconnecting the said primary and secondary driven gears to operate in unison, rack means embedded on the decks of said flat cars in meshing engagement with the said primary and secondary driven gears, and mechanism in said geared drive means adapted to direct and reverse the rotation of the said primary and secondary driven gears.

5. In a freight loading system adapted for loading trailers onto flat cars operating on rails, motivating means adapted to move a train of flat cars a predetermined distance intermittently comprising, geared drive means motivated by a suitable prime mover, a driving pinion associated with the said geared drive means, a primary driven gear in meshing relationship with the said driving pinion, a secondary driven gear positioned at a distance less than the length of one of said flat cars from the said primary driven gear, chain and sprocket means interconnecting the said primary and secondary driven gears to operate in unison, rack means embedded on the decks of said flat cars in meshing engagement with the said primary and secondary driven gears, mechanism in said geared drive means adapted to direct and reverse the rotation of the said primary and secondary driven gears, and lever means adapted to control the direction of rotation of the said primary and secondary driven gears.

6. A freight loading system comprising, a train of flat cars, rack means embedded in the top decks of said flat cars, a horse-shoe-shaped ramp structure astraddle the said train of flat cars, its upper platform clearing the top decks thereof, primary and secondary driven gears operating in bearings secured to the said horse-shoe-shaped ramp structure in meshing engagement with the said rack means, chain and sprocket means interconnecting the said primary and secondary driven gears, and drive gear mechanism having its driving pinion in meshing relationship with the said primary driven gear.

7. A freight loading system comprising, a train of flat cars, rack means embedded in the top decks of said flat cars, a horse-shoe-shaped ramp structure astraddle the said train of flat cars, its upper platform clearing the top decks thereof, primary and secondary driven gears operating in bearings secured to the said horse-shoe-shaped ramp structure in meshing engagement with the said rack means, chain and sprocket means interconnecting the said primary and secondary driven gears, and direct and reversible drive gear mechanism having its driving pinion in meshing relationship with the said primary driven gear.

8. A freight loading system comprising, a train of flat cars, rack means embedded in the top decks of said flat cars, a horse-shoe-shaped ramp structure astraddle the said train of flat cars, its upper platform clearing the top decks thereof, primary and secondary driven gears operating in bearings secured to the said horse-shoe-shaped ramp structure in meshing engagement with the said rack means, chain and sprocket means interconnecting the said primary and secondary driven gears, direct and reversible drive gear mechanism having its driving pinion in meshing relationship with the said primary driven gear, and lever means associated with the said drive gear mechanism adapted to control the direction of rotation of the driving pinion in the said drive gear mechanism.

BROOKS E. JOHNSTON.